US012717754B2

(12) United States Patent
Pedersen et al.

(10) Patent No.: US 12,717,754 B2
(45) Date of Patent: Aug. 25, 2026

(54) SYSTEMS, METHODS, AND MEDIA FOR ELECTRONIC DOCUMENT MANAGEMENT IN A COMPUTING ENVIRONMENT

(71) Applicant: FMR LLC, Boston, MA (US)

(72) Inventors: Scott Pedersen, Lyndeborough, NH (US); Violetta Hendricks, Nashua, NH (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/787,022

(22) Filed: Jul. 29, 2024

(65) Prior Publication Data

US 2026/0030201 A1 Jan. 29, 2026

(51) Int. Cl.
*G06F 16/93* (2019.01)
*G06F 16/11* (2019.01)

(52) U.S. Cl.
CPC ............ *G06F 16/125* (2019.01); *G06F 16/93* (2019.01)

(58) Field of Classification Search
None
See application file for complete search history.

(56) References Cited

U.S. PATENT DOCUMENTS 8,527,468 B1 * 9/2013 Crafford ................ G06F 16/93 707/662
2003/0108054 A1 * 6/2003 Williams ................ H04L 61/35 370/401
2009/0228525 A1 * 9/2009 Fridrich ................ G06Q 10/10
2019/0266256 A1 * 8/2019 Dudani ................ G06F 16/162

OTHER PUBLICATIONS

Gianpaolo Cugola; Processing Flows of Information: From Data Stream to Complex Event Processing; ACM; pp. 1-62 (Year: 2012).*

* cited by examiner

*Primary Examiner* — Ann J Lo
*Assistant Examiner* — Jermaine A Mincey
(74) *Attorney, Agent, or Firm* — Cesari and McKenna, LLP; Omar M. Wadhwa

(57) ABSTRACT

Techniques are provided for electronic document management in a computing environment. A business unit and a document type determined for an electronic document may be used to determine that an electronic document is required to adhere to an event-based retention policy. An entry for the document can be created in an event-mapping data structure. Events and actions that occur at each system of record can be tracked by generating an entry in an event tracking data structure. The system of record and attribute value from each entry in the event tracking data structure may be utilized to identify matching entries in the event-based mapping data structure. The expiration date in a matching entry, which corresponds to an electronic document, can be updated using the event date in the event tracking entry and the duration of the event-based retention policy included in the matching entry.

20 Claims, 9 Drawing Sheets

| LABEL | DURATION | TYPE |
| --- | --- | --- |
| 26 | 7 | EVENT |
| 27 | 3 | TIME |
| • • • | • • • | • • • |

| BU | LABEL | SOR |
| --- | --- | --- |
| SC | 26 | BrokeServ |
| WM | 26 | BrokeServ |
| • • • | • • • | • • • |

112

405A

| BU | DOCUMENT TYPE | LABEL | DURATION | EXPIRATION DATE |
|---|---|---|---|---|
| PAYROLL SERVICES | PAYROLL RECORD | 27 | 3 | JANUARY 12, 2027 |
| ⋮ | ⋮ | ⋮ | ⋮ | ⋮ |

| | BU | DOCUMENT TYPE | ATTRIBUTE | SOR | DURATION | EXPIRATION DATE |
|---|---|---|---|---|---|---|
| 505A | SC | ACCOUNT STATEMENT | X01 | BrokeServ | 7 | |
| 505B | PERFORMANCE MANAGEMENT | EMPLOYEE REVIEW | A123 | HR | 2 | |
| 505C | EMPLOYEE ENGAGEMENT | INTERNAL MARKETING MATERIAL | ZZ1 | MARKETING | 1 | |
| | ... | ... | ... | ... | ... | |

| | BU | DOCUMENT TYPE | ATTRIBUTE | SOR | DURATION | EXPIRATION DATE |
|---|---|---|---|---|---|---|
| 505A | SC | ACCOUNT STATEMENT | X01 | BrokeServ | 7 | JUNE 5, 2031 |
| 505B | PERFORMANCE MANAGEMENT | EMPLOYEE REVIEW | A123 | HR | 2 | JUNE 5, 2026 |
| 505C | EMPLOYEE ENGAGEMENT | INTERNAL MARKETING MATERIAL | ZZ1 | MARKETING | 1 | JULY 4, 2025 |
| | ... | ... | ... | ... | ... | ... |

FIG. 5B

SYSTEMS, METHODS, AND MEDIA FOR ELECTRONIC DOCUMENT MANAGEMENT IN A COMPUTING ENVIRONMENT

BACKGROUND

Technical Field

The present disclosure relates generally to electronic document management, and more specifically to techniques for managing electronic documents of different types based on event-based retention policies.

Background Information

Electronic document retention and destruction policies are extremely important for enterprises (i.e., organizations) due to their critical role in navigating the intricacies of regulatory compliance and data governance in the digital era. These policies ensure adherence to stringent data protection laws such as the California Consumer Privacy Act (CCPA), the Health Insurance Portability and Accountability Act (HIPAA), the Sarbanes-Oxley Act (SOX), the General Data Protection Regulation (GDPR), the Financial Industry Regulatory Authority (FINRA) Rules, and others, thereby safeguarding against legal liabilities and hefty fines associated with non-compliance.

The policies also serve to protect against cyber threats and unauthorized access, preserving the integrity and confidentiality of sensitive electronic information such as Personally Identifiable Information (PII). To that end, and by destroying electronic documents in accordance with the policies, electronic document sanitization is maintained by the enterprise since the sensitive data of the destroyed electronic documents cannot be recovered or reconstructed, thereby protecting privacy and confidentiality.

Beyond security, the policies optimize operational efficiency for the enterprise by effectively managing electronic document storage and retrieval, minimizing storage costs and enhancing productivity. Moreover, adherence to robust retention and destruction rules fosters transparency, accountability, and trust among stakeholders, auditors, compliance agencies, etc., which is crucial for an enterprise's success in an increasingly interconnected digital business landscape.

However, implementing the various different electronic document retention and destruction policies for compliance is no easy task for enterprises. For example, a typical enterprise will include a plurality of systems of record. This is because a typical enterprise needs to manage and maintain authoritative sources of data across various functional areas and types of information. Each different system of record (SOR) serves as a primary source of truth for specific types of data, ensuring accuracy, reliability, and accessibility for operational and analytical purposes. Each SOR may be a record keeping platform for one or more document types that are stored at a central repository. Specifically, a plurality of different systems of record may independently act as record keeping platforms for different types of documents that are centrally stored at the repository. For example, customer data that is managed by a particular SOR may be stored at the central repository and may be structured differently when compared to financial data and/or employee data that is also stored at the central repository and managed by other SORs. In short, enterprises typically store many different document types at a central repository where different systems of record operate as record keeping platforms for those stored documents.

Each document type may, for example, be required to adhere to a different electronic document retention policy. This is further complicated by event-based retention policies. Event-based electronic document retention policies trigger, i.e., start, the retention clock at some future date when a specific event or action occurs. That is, the start date of the retention clock is not known on the date on which the electronic document was created, modified, or stored. Therefore, the many different document types and many different event-based retention policies make it very difficult for enterprises to properly manage their electronic documents such that the electronic documents are retained for the necessary amount of time as required by the event-based policies.

Out of an abundance amount of caution, some enterprises decide to store their electronic documents for longer than is required to ensure that they do not violate any event-based retention policies, because doing so may result in legal risks, operational risks, fines, etc. However, storing electronic documents for longer than required is undesirable. Specifically, doing so means that electronic document sanitization is not achieved, sensitive electronic information is potentially accessible to cyber threats and unauthorized access for longer than is necessary, storage costs and resources are wasted, etc. Furthermore, operational efficiency is not maintained, which may be perceived negatively by stakeholders, auditors, and the like.

Therefore, what is needed is a technique for efficient and effective implementation of event-based retention policies for electronic documents such that event-based retention policies are not violated, while also ensuring that the issues as described above are not encountered.

SUMMARY

Techniques are provided for electronic document management in a computing environment. As will be described in further detail below, the one or more embodiments as described herein can track events that occur at systems of record of an enterprise to update a retention expiration date of entries that correspond to electronic documents that are required to adhere to event-based retention policies. As a result, the updated retention expiration date can be utilized to efficiently and effectively manage electronic documents in a computing environment.

Specifically, and when an electronic document is to be stored at a repository, a processor (e.g., a processor executing a software module) may determine a business unit associated with the electronic document and may also determine a document type of the electronic document. The processor may use the determined business unit and document type to determine whether the electronic document is required to adhere to a time-based retention policy or an event-based retention policy.

When the electronic document is required to adhere to an event-based retention policy, the processor may generate an entry for the electronic document in an event-based mapping data structure. In an embodiment, the entry includes the business unit associated with the electronic document, the document type, an attribute value corresponding to the electronic document, a system of record corresponding to the electronic document, and a duration of the event-based retention rule that the electronic document is required to adhere to.

Additionally, the processor may communicate with each system of record of the enterprise to generate an entry in an event tracking data structure when an action or event occurs at a system of record. In an embodiment, each entry of the event tracking data structure includes the system of record where the event or action occurred, an attribute value associated with the event or action at the system of record, and a date on which the event or action occurred.

According to the one or more embodiments as described herein, the processor may process each of the entries in the event tracking data structure to efficiently and effectively manage electronic documents that are required to adhere to event-based retention policies. Specifically, and for each entry of the event tracking data structure, the processor may utilize the system of record and attribute value of the entry to identify one or more matching entries in the event-based mapping data structure. Based on the match, the processor may update the expiration date of the entry in the event-based mapping data structure using the event date from the entry in the event tracking data structure. In an embodiment, the expiration date is a summation of the duration in the event-based mapping entry and the event date in the event tracking entry.

As a result, the electronic document corresponding to the updated event-based mapping entry can be destroyed or anonymized when the expiration date lapses. Therefore, the one or more embodiments as described herein provide a technique for efficiently and effectively managing electronic documents that are required to adhere to event-based retention policies.

BRIEF DESCRIPTION OF THE DRAWINGS

The description below refers to the accompanying drawings, of which:

FIG. 4 is an illustration of an example entry of a time-based mapping data structure for a document injected into the repository according to the one or more embodiments as described herein;

FIG. 5A is an illustration of example entries of event-based mapping data structure for three documents injected into the repository according to the one or more embodiments as described herein;

FIG. 5B is an illustration of example entries of event-based mapping data structure that have been updated with expiration dates according to the one or more embodiments as described herein;

DETAILED DESCRIPTION OF AN ILLUSTRATIVE EMBODIMENT

Figure 1A:
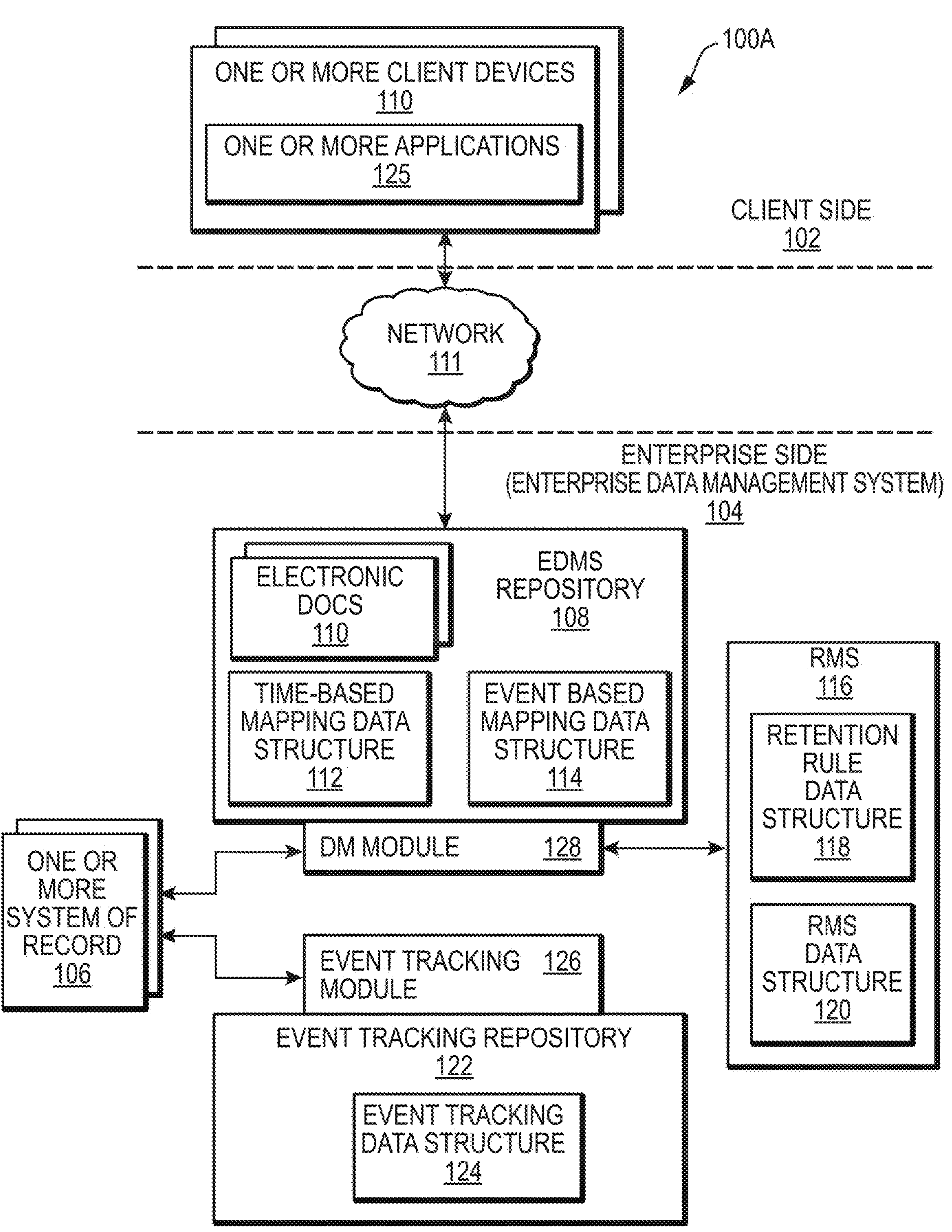
FIG. 1A is a high-level block diagram of an example system environment for electronic document management in a computing environment according to one or more embodiments as described herein.

FIG. 1A is a high-level block diagram of an example system environment 100A for electronic document management in a computing environment according to one or more embodiments as described herein. System environment 100A may be divided into a client side 102 that includes one or more local client devices 110 that are local to end users, and an enterprise side 104 that is remote end users. Enterprise side 104 may be managed, operated, and maintained by an enterprise. In an embodiment, the enterprise of enterprise side 104 may be a financial services institution.

The client side 102 may include one or more local client devices 110 that provide a variety of user interfaces and non-processing intensive functions. For example, a local client device 110 may provide a user interface, e.g., a graphical user interface and/or a command line interface, for receiving user input and displaying output according to the one or more embodiments as described herein. In an embodiment, the client device 110 may be a server, a workstation, a platform, a mobile device, a network host, or any other type of computing device. The client device 110 may be operated by, for example, customers of the enterprise. Client device 110 may also be operated by authorized personnel, e.g., employees of the enterprise, to perform enterprise functions. Client device 110 may download and execute one or more client side applications 125. In an embodiment, the execution of application 125 may allow customers and/or employees of the enterprise to implement one or more financial services functions.

The client device 110 may communicate with the enterprise side 104, managed/operated by the enterprise, over network 111. For example, a user may utilize application 125, executing on client device 110, to perform one or more functions at enterprise side 104 as will be described in further detail below.

Enterprise side 104 may be referred to as an enterprise data management system (EDMS) 104 and these phrases may be used interchangeably. EDMS 104 may be hosted on cloud-devices or on on-premises devices, for example.

EDMS 104 includes one or more systems of record 106. Each system of record (SOR) 106 serves as a primary source of truth for specific types of data, ensuring accuracy, reliability, and accessibility for operational and analytical purposes. In an embodiment, an authorized employee may access a SOR 106 and its data via application 125 of client device 110.

EDMS 104 also includes EDMS repository 108. For simplicity, EDMS repository 108 may be referred to as repository 108 as described herein. Repository 108 may store electronic documents 110 that may be generated or modified based on the operation of one or more systems of record 106. Repository 108 may also store time-based mapping data structure 112 that stores a time-based entry for each electronic document 110 that is required to adhere to a time-based retention policy as will be described in further detail below. Time-based retention policies trigger, i.e., start, the retention clock on a predetermined date that is known, such as, but not limited to, the electronic document creation date, the electronic document modification date, or the date on which the electronic document was stored at the repository 108.

Further, repository 108 may store event-based mapping data structure 114 that stores an event-based entry for each electronic document 110 that is required to adhere to an event-based retention policy as will be described in further detail below. Event-based electronic document retention policies trigger, i.e., start, the retention clock at some future date (e.g., future date when compared to the date on which the electronic document 110 is stored at repository 108) when a specific event or action occurs.

EDMS 104 also includes record management system (RMS) 116 that may store data structures that support the management of electronic documents 110 and operation of time-based mapping data structure 112 and event-based mapping data structure 114 as will be described in further detail below. RMS 116 may include retention rule data structure 118 that stores one or more retention rules such as time-based retention policies and event-based retention policies. RMS 116 may also include RMS data structure 120 that stores information corresponding to systems of record 106 and labels for different types of electronic documents 110 as will be described in further detail below.

EDMS further includes event tracking repository 122. As will be described in further detail below, event tracking repository 122 may store event tracking data structure 124 that may include entries for events or actions that occur at the one or more systems of record 106.

EDMS also includes DM module 128 and event tracking module 126 that may implement the one or more embodiments as described herein. Specifically, and as will be described in further detail below, the DM module 128 and event tracking module 126 can efficiently and effectively manage electronic documents that are required to adhere to event-base retention policies such that the electronic documents can be timely destroyed or anonymized after the required retention period has lapsed.

In an embodiment, EDMS repository 108 and/or event tracking repository 122 may be one or more of (1) one or more databases (e.g., relational databases), hard disk drives (HDDs), and/or solid state drives (SSDs).

Figure 1B:
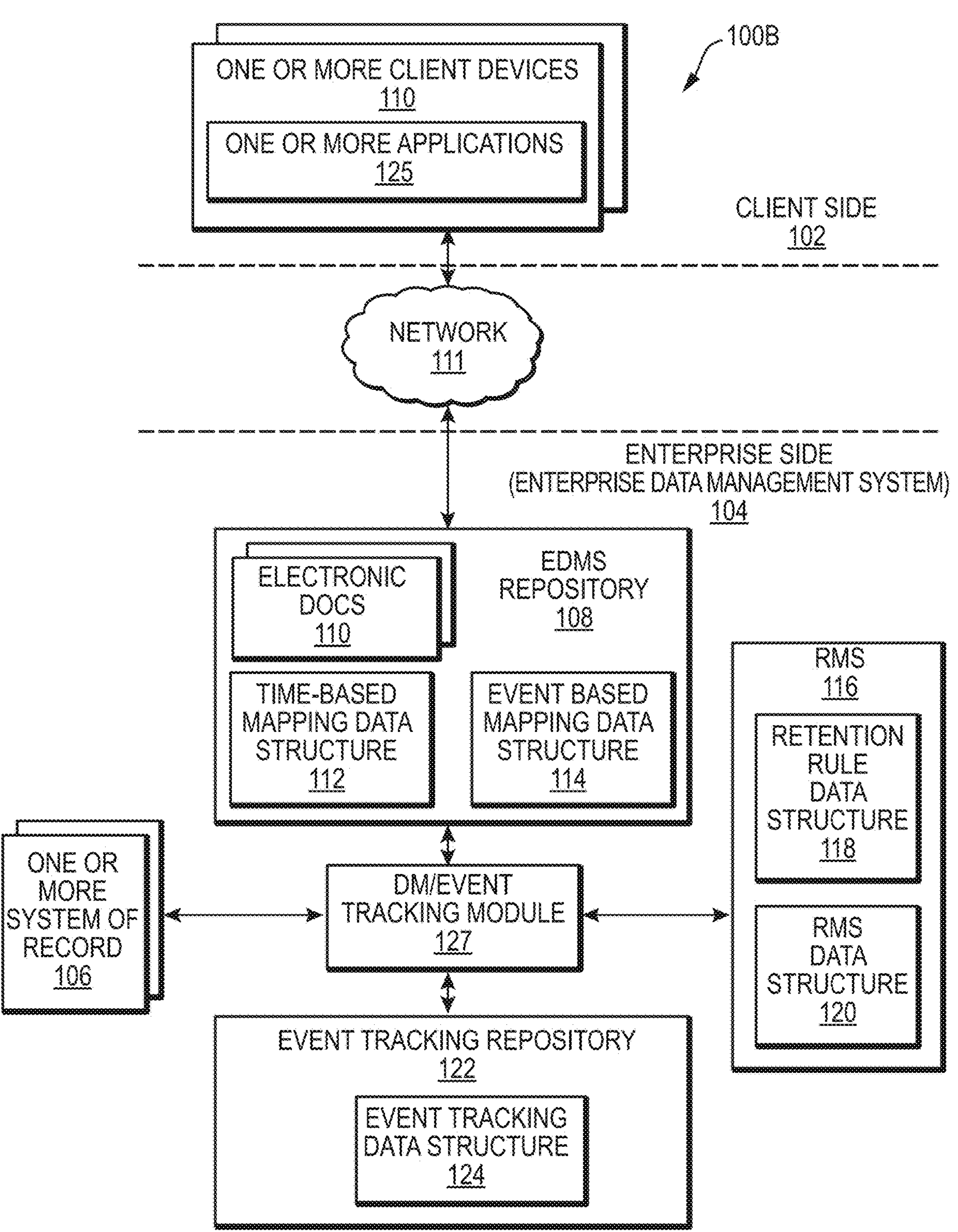
FIG. 1B is a high-level block diagram of a different example system environment for electronic document management in a computing environment according to one or more embodiments as described herein.

FIG. 1B is a high-level block diagram of a different example system environment 100B for electronic document management in a computing environment according to one or more embodiments as described herein. System environment 100B of FIG. 1B is similar to system environment 100A of FIG. 1A. However, system environment 100B does not include DM module 128 and event tracking module 126 that are separate and distinct. Instead, system environment 100B includes a single module, namely DM/event tracking module 127, that implements the one or more embodiments as described herein.

As will be described in relation to the flow diagram of FIG. 2, an entry can be generated for event-based mapping data structure 114 that stores relevant information for each electronic document 110 that is required to adhere to an event-based retention policy. Further, and as will be described in relation to the flow diagram of FIG. 6, an entry can be generated for event tracking data structure 124 that stores relevant information for each event or action that occurs at one or more systems of record 106. Further, and as will be described in relation to the flow diagram of FIG. 8, the entries from event tracking data structure 124 can be processed to identify corresponding entries in event-based data structure 114 such that the identified entries can be updated to include a retention expiration date. As a result, the electronic documents 110 corresponding to the updated event-based entries adhere to the event-based retention policies and can also be destroyed or anonymized timely and efficiently for proper management of electronic documents at repository 108. Specifically, the one or more embodiments as described herein can destroy or anonymize an electronic document 110 in a timely manner after the retention expiration date lapses.

As a result, the one or more embodiments as described herein ensure that electronic document sanitization is achieved, sensitive electronic information is not accessible to cyber threats and unauthorized access for longer than is necessary, and storage costs and resources are preserved and not wasted. Furthermore, operational efficiency and transparency is maintained, which can be important to stakeholders, auditors, and the like.

Therefore, the one or more embodiments as described herein provide an improvement in the technological field of electronic document management and, namely, electronic document management with event-based retention policies. Further, some conventional systems store electronic documents for longer than is necessary to ensure that no retention policies (e.g., event-based retention policies) are violated, which results in wasted storage resources. Because the one or more embodiments as described herein destroy or anonymize electronic documents more efficiently and timely than these conventional systems, the one or more embodiments as described herein conserve storage resources. Accordingly, the one or more embodiments as described herein provide an improvement to the underlying computer, e.g., EDMS 104, itself.

Figure 2:
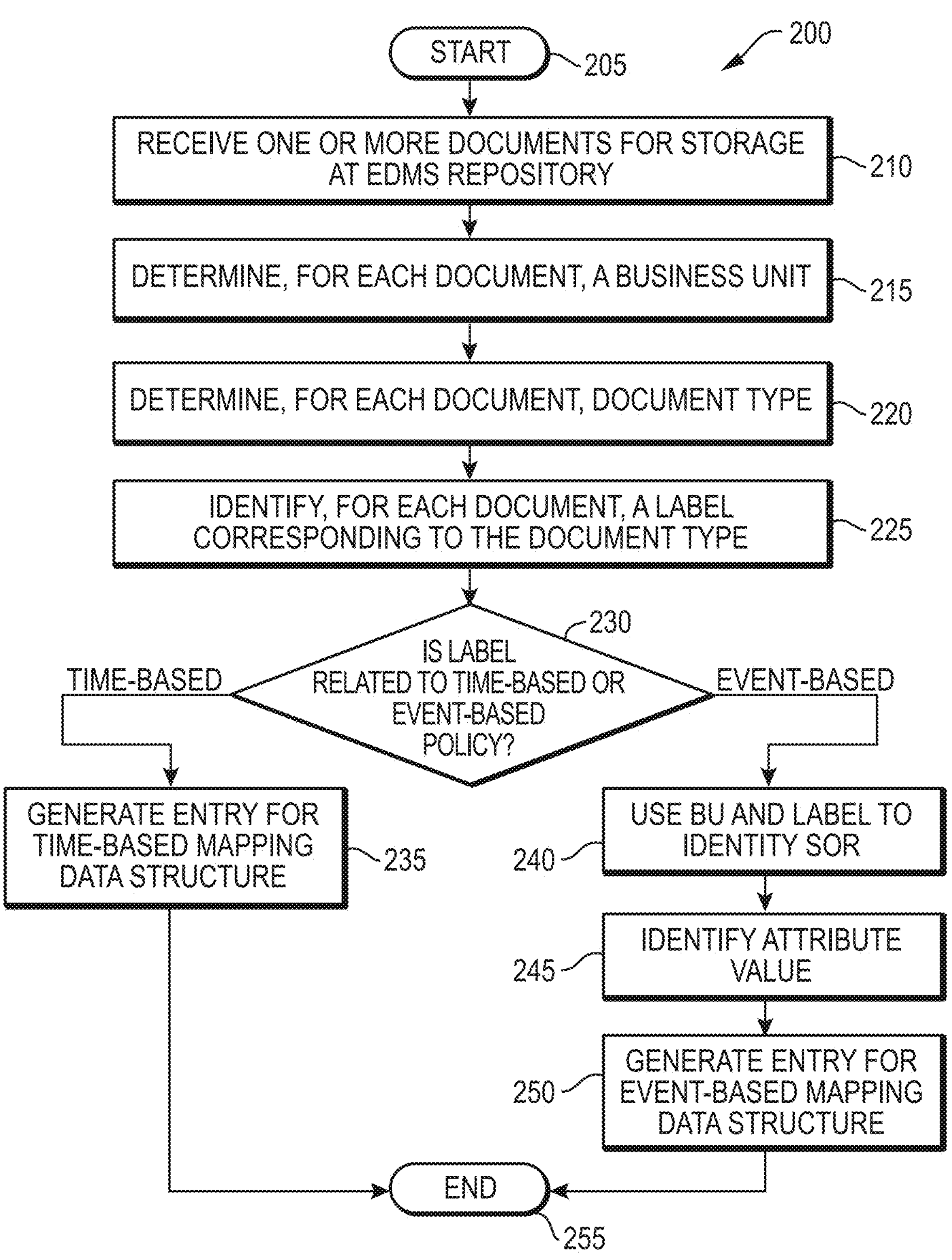
FIG. 2 is a flow diagram of a sequence of steps for generating entries for an event-based mapping data structure of enterprise data management system repository according to the one or more embodiments as described herein.

FIG. 2 is a flow diagram of a sequence of steps for generating entries for event-based mapping data structure 114 of EDMS repository 108 according to the one or more embodiments as described herein. Although the examples as described in relation to FIG. 2 may refer to DM module 128 performing one or more functions/steps, it is expressly contemplated that DM/event tracking module 127 of FIG. 1B may also perform the one or more functions/steps according to the one or more embodiments as described herein.

Procedure 200 starts at step 205 and continues to step 210. At step 210, the EDMS repository 108 receives one or more electronic documents 110 for storage. For example, one or more enterprise employees may utilize application 125 executing on client devices 110 to communicate with one or more systems of record 106. Based on the communication, one or more electronic documents corresponding to the enterprise may be generated or modified and stored at EDMS repository 108.

As an example, let it be assumed that the enterprise is a finance brokerage firm and that the EDMS repository 108 receives four electronic documents for storage at step 210. The use of four electronic documents in this example is for simplicity and illustrative purposes only and it should be expressly understood that the EDMS repository 108 may receive many more electronic documents for storage simultaneously or consecutively.

For this example, let it be assumed that the first electronic document is a brokerage account statement for customer X01 that was generated by the brokerage services department of the enterprise. Let it be assumed that the second electronic document is a payroll record for the enterprise that was generated by the human resources (HR) department of the enterprise. Let it be assumed that the third electronic document is an employee review for employee A123 that was generated by the HR department of the enterprise. Finally, let it be assumed that the fourth electronic document is marketing material that was generated by the marketing department of the enterprise, where the marketing material is distributed internally to employees of the enterprise.

Each document that is stored in EDMS repository 108 may have a unique document identifier to differentiate the document from other documents in EDMS repository 108. In an embodiment, EDMS repository 108 receiving electronic documents for storage and/or storing the electronic documents may be referred to as electronic documents being injected at EDMS repository 108.

The procedure continues from step 210 to step 215. At step 215, the DM module 128 determines a business unit (BU) for each electronic document received. In an embodiment, the DM module 128 may analyze the electronic document and/or metadata corresponding to the electronic document to identify the BU. For example, when the request to store the electronic document is received from a particular SOR 106, the DM module 128 may analyze the metadata corresponding to the request to determine/identify the BU corresponding to the request to store the electronic document.

Continuing with the example, the EDMS repository 108 received a storage request for the brokerage account statement corresponding to customer X01. The DM module 128 may analyze the metadata of the request to determine that the BU corresponding to the request is settlement and clearing. Similarly, the DM module 128 may analyze the metadata of the requests to store the payroll record and the employee review for employee A123. Based on the analysis, the DM module 128 may determine that the BU corresponding to the payroll record is payroll services. The DM module 128 may determine that the BU corresponding to the employee review is performance management.

Further, the DM module may analyze the metadata of the request to store the internal marketing material. Based on the analysis, the DM module 128 may determine that the BU corresponding to this request is employee engagement.

In an alternative embodiment, the DM module 128 may analyze the electronic documents themselves to identify the BU. For example, a header or footer of an electronic document may include the BU. In this embodiment, the DM module 128 may analyze the header or footer of the electronic document to identify the BU.

Even more, each request to store an electronic document at EDMS repository 108 may be initiated by an employee of the enterprise that is operating client device 110. Therefore, and in an even further embodiment, the employee may utilize application 125 executing on client device 110 to explicitly indicate the BU corresponding to the electronic document to be stored at EDMS repository 108. For example, application 125 may present a graphical user interface or a command line interface requesting that the user operating client device 110 select a particular BU of a plurality of different displayed BUs of the enterprise.

The procedure 200 continues from step 215 to step 220. At step 220, the DM module 128 determines a document type for each document. Continuing with the example, the DM module 128 determines a document type for each of the brokerage account statement, the payroll record, the employee review, and the internal marketing material.

As explained in relation to step 220, each request to store an electronic document at EDMS repository 108 may be initiated by an employee of the enterprise that is operating client device 110. In an embodiment, the employee may utilize application 125 executing on client device 110 to provide the document type to the DM module 128. For example, an employee of the enterprise that works in the brokerage services department may utilize application 125 executing on client device 110 requesting that the brokerage account statement be stored at EDMS repository 108. Based on the storage request, DM module 128 may transmit a document type request over network 111 to client device 110. For example, the document type request may be in the form of a graphical user interface or a command line interface asking for a selection of a document type from a plurality of different potential document types. The employee may utilize application 125 executing on client device 110 to select a document type, which then may be transmitted over network 111 to DM module 128.

Continuing with the example, let it be assumed that a brokerage services employee uses application 125 executing on client device 110 to indicate that the document type is an account statement. Similarly, an HR employee may use application 125 executing on client device 110 to indicate that the document types are payroll record and employee review. Moreover, a marketing employee may use application 125 executing on client device 110 to indicate that the document type is internal marketing material.

Procedure 200 continues from step 220 to step 225. At step 225, the DM module 128 determines, for each electronic document, a label that is based on the determined BU and document type. In an embodiment, each BU may maintain a BU mapping that stores an association between each document type and label. Therefore, there may be a different BU mapping for each different BU.

Continuing with the example, the DM module 128 determines at step 215 that the brokerage account statement corresponds to the settlement and clearing BU. Therefore, the DM module 128 may utilize an identifier for settlement and clearing to identify the settlement and clearing BU mapping. The DM module 128 may index into the settlement and clearing BU mapping using the document type, which in this example is account statement, to identify a particular entry (e.g., row) in the settlement and clearing BU mapping. The DM module 128 may then identify the label that is stored in the particular entry. Therefore, in this example, let it be assumed that the DM module 128 determines that label "26" is stored in the entry of account statements of the settlement and clearing BU mapping.

Similarly, the DM module 128 may identify the payroll services BU mapping using an identifier for payroll services. The DM module 128 may index into the payroll services BU mapping using the document type, which in this example is a payroll record, to identify the corresponding label. For this example, let it be assumed that the label "27" is stored in the entry of payroll record of the payroll services BU mapping. Moreover, the DM module 128 may identify the performance management BU mapping using an identifier for performance management. The DM module 128 may index into the performance management BU mapping using the document type, which in this example is an employee review, to identify the corresponding label. For this example, let it be assumed that the label "25" is stored in the entry of employee review of the performance management BU mapping.

Further, the DM module 128 may identify the employee engagement BU mapping using an identifier for employee engagement. The DM module 128 may index into the employee engagement BU mapping using the document type, which in this example is internal marketing material, to identify the corresponding label. For this example, let it be assumed that the label "24" is stored in the entry of internal marketing material of the employee engagement BU mapping.

The procedure 200 continues from step 225 to step 230. At step 230, the DM module 128 determines if the label is related to a time-based retention policy or an event-based retention policy. In an embodiment, the DM module 128 utilizes the label to index into retention rule data structure 118 of RMS 116 to determine if the label is related to a time-based retention policy or an event-based retention policy.

Figure 3A:
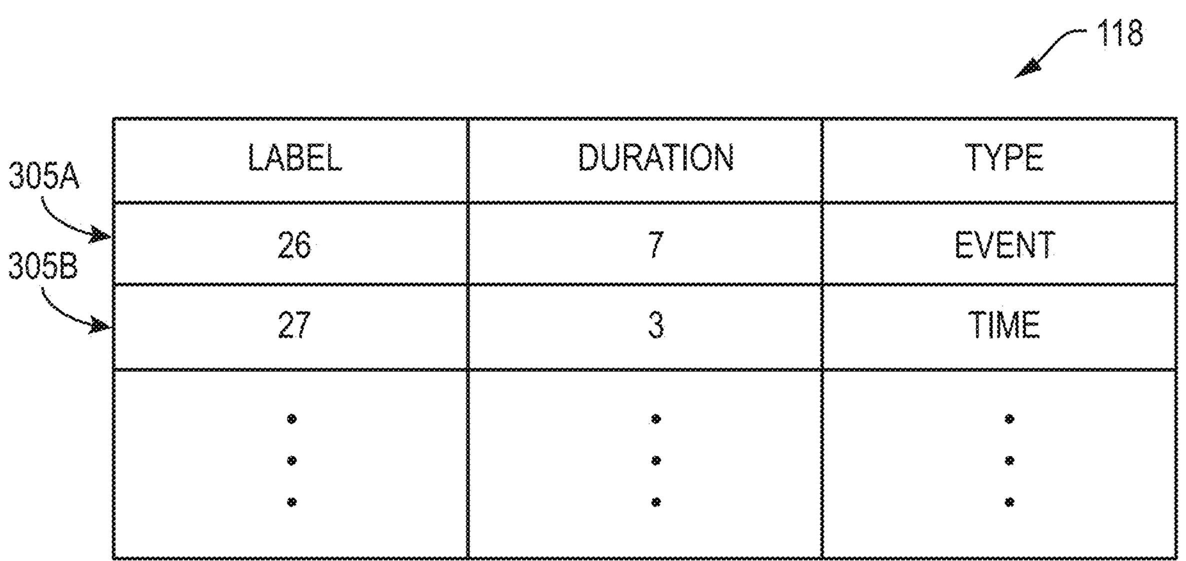
FIG. 3A is an illustration of an example entry of a retention rule data structure according to the one or more embodiments as described herein.

FIG. 3A is an illustration of an example entry of retention rule data structure 118 according to the one or more embodiments as described herein. As depicted in FIG. 3A, example retention rule data structure 118 includes two example entries 305A and 305B. Each of entries 305A and 305B may correspond to a different electronic document retention policy, wherein the retention policy may be either a time-based retention policy or an event-based retention policy.

As illustrated in FIG. 3A, each of the two entries 305A and 305B include values/identifies that are stored in at least a Label column, a Duration column, and a Type column. In an embodiment, the DM module 128 may identify an entry in retention rule data structure 118, which corresponds to a particular retention rule, using the label identified in step 225.

For example, the DM module 128 identified label 26 for the brokerage account statement. Therefore, the DM module 128 may index into retention rule data structure 118 of FIG. 3A and identify entry 305A, i.e., row, for label 26. The DM module 128 can determine that the Type column of entry 305A indicates that the retention policy for label 26 is an event-based retention policy.

Further, the DM module 128 identified label 27 for the payroll record. Therefore, the DM module 128 may index into retention rule data structure 118 of FIG. 3A and identify entry 305B, i.e., row, for label 27. The DM module 128 can determine that the Type column indicates that the retention policy for label 27 is a time-based retention policy. Therefore, the DM module 128 can determine whether a retention rule for an electronic document is event-based or time-based using the label identified for the electronic document at step 225 and as described herein.

If the DM module 128 determines that the label of the electronic document is related to a time-based retention policy, the procedure continues from step 230 to step 235. At step 235, the DM module 128 generates an entry for time-based mapping data structure 112.

Continuing with the example, the DM module 128 determined that the payroll record is associated with a time-based retention policy. That is, the payroll record is required to adhere to a time-based retention policy not an event-based retention policy. Therefore, the DM module 128 generates an entry for the payroll record in time-based mapping data structure.

FIG. 4 is an illustration of an example entry 405A of a time-based mapping data structure 112 for a document injected into EDM repository 108 according to the one or more embodiments as described herein. In an embodiment, each entry, i.e., row, of time-based mapping data structure 112 includes values/identifiers that are stored in at least a BU column, a Document Type column, a Label column, a Duration column, and an Expiration Date. Therefore, and for the example of the payroll record, the DM module 128 generates entry 405A for the payroll record that includes values/identifiers in the above identified columns. Specifically, the DM module 128 generates entry 405A that stores payroll services, which was determined in step 215 for the payroll record, in the BU column of entry 405A. Further, DM module 128 stores payroll record, which was determined in step 220, in the document type column of entry 405A. Moreover, the DM module 128 stores 27, which was identified in step 225 for the payroll record, in the Label column of entry 405A.

In an embodiment, the DM module 128 determines the duration, for the Duration column, based on the appropriate entry of the retention rule data structure 118 of FIG. 3A. For example, the payroll record corresponds to entry 305B and label 27. Therefore, the DM module 128 determines the duration for the payroll record from entry 305B. In this example, the duration column for entry 305B corresponding to label 27 stores an identifier of 3 indicating that a payroll record is required to be retained/maintained for 3 years from the date the payroll record is stored at repository 108. Therefore, the DM module 128 stores 3, which is the required duration of time that the payroll record must be retained for, in the Duration column of entry 405A.

Because the payroll record is required to adhere to a time-based retention policy and not an event-based retention policy, the expiration date can be determined and stored for entry 405A at the time that the document is stored at repository 108. For this example, let it be assumed that the document is stored at repository 108 on Jan. 12, 2024. Therefore, the DM module 128 may calculate the expiration date, i.e., retention expiration date, as a summation of the storage date and the duration time period. Therefore, and in this example, the DM module 128 calculates the expiration date for the payroll record as Jan. 12, 2027. Therefore, the DM module 128 stores Jan. 12, 2027, which is the retention expiration date for the payroll record, in the Expiration Date column.

Referring back to FIG. 2, if the label is related to an event-based retention policy in step 230, the procedure continues from step 230 to step 240. At step 240, the DM module 128 identifies an SOR for each document associated with an event-based retention policy.

Continuing with the example, let it be assumed that the label of 26 for the brokerage account statement, the label of 25 for the employee review, and the label of 24 for the internal marketing material are each associated with an event-based retention policy. As such, the DM module 128 determines an SOR for each of the brokerage account statement, the employee review, and the internal marketing material.

In an embodiment, the DM module 128 determines an SOR for an electronic document, which is required to adhere to an event-based retention policy, using the corresponding BU and label with the RMS data structure 120. Specifically, the DM module 128 utilizes the BU together with the label to identify an entry in RMS data structure 120. The DM module 128 may then identify the SOR from the entry identified in the RMS data structure 120.

Figure 3B:
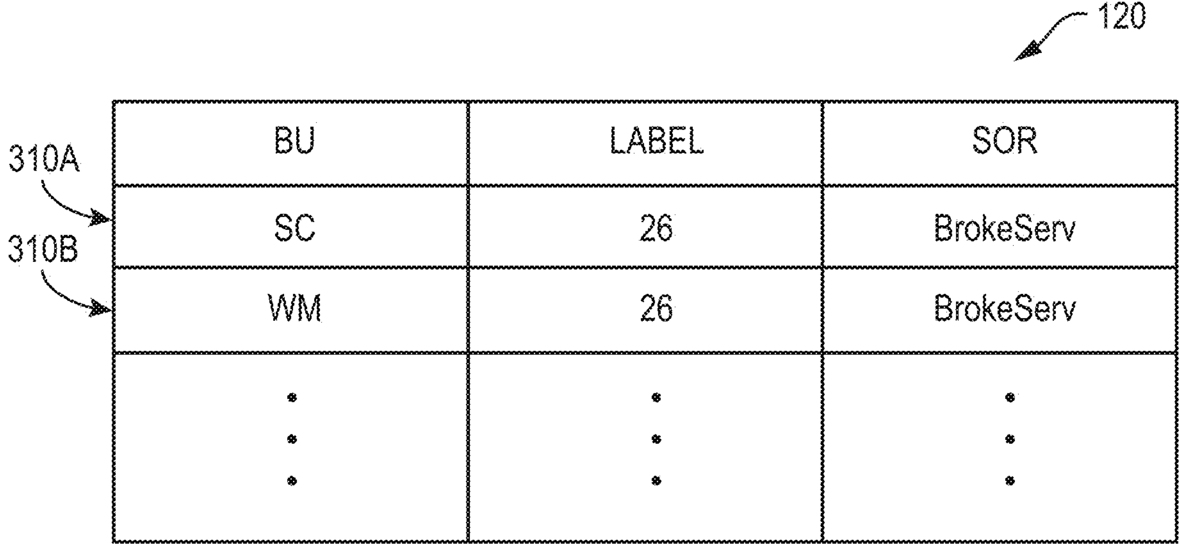
FIG. 3B is an illustration of example entries of a record management system data structure according to the one or more embodiments as described herein.

FIG. 3B is an illustration of example entries of RMS data structure 120 according to the one or more embodiments as described herein. Each entry has a corresponding BU column, Label column, and SOR column. The DM module 128 uses the BU and label for the electronic document, which is required to adhere to the event-based retention policy, to identify the entry and corresponding SOR for the entry.

For this example, the two entries correspond to two different business units that have the same label. Specifically, the first entry 310A corresponds to a BU of settlement and clearing, identified by SC, and has a label of 26. The second entry 310B corresponds to a BU of wealth management, identified by WM, and has the same label of 26. Therefore, for the brokerage account statement as described herein, the DM module may use the BU of settlement and clearance, which is identified in step 215, with the label 26 that is identified in step 225 to select the first entry for the brokerage account statement. The DM module 128 may then identify brokerage services, identified by BrokeServ, as the SOR column of the first entry to determine that the SOR for the brokerage account statement is brokerage services. Therefore, two different BUs can have the same label and have the same corresponding SOR.

For the example described herein, let it be assumed that the DM module 128 determines from RMW data structure 120 that the SOR for the brokerage account statement is brokerage services. Further, let it be assumed that the DM module 128 determines from RMW data structure 120 that the SOR for the employee review is HR. Moreover, let it be assumed that the DM module determines from the RMW data structure 120 that the SOR for the internal marketing material is the marketing department.

Referring back to FIG. 2, the procedure continues from step 240 to step 245. At step 245, the DM module 128 identifies an attribute value for each document associated with an event-based retention policy Continuing with the example, the DM module 128 determines an attribute value for each of the brokerage account statement, the employee review, and the internal marketing material.

In an embodiment, the DM module 128 may determine an attribute value for each electronic document in a similar manner to determining the document type as described above in relation to step 220. For this example, let it be assumed that the attribute value for the brokerage account statement is X01. That is, the brokerage account statement is for a customer that is identified by X01. Further, let it be assumed that the value name for the employee review is A123. That is, the employee review is for an employee that is identified by A123. Moreover, let it be assumed that the attribute value for the internal marketing document is ZZ1. That is, the internal marketing document has a document identifier of ZZ1.

The procedure continues from step 245 to step 250. At step 250, the DM module 128 generates an entry, in event-based mapping data structure 114, for each electronic document associated with an event-based retention policy.

Again, the brokerage account statement, the employee review, and the internal marketing material are each associated with an event-based retention policy that corresponds to an entry in retention rule data structure 118. Therefore, and in this example, the DM module 128 generates an entry in event-based mapping data structure 114 for each of the brokerage account statement, the employee review, and the internal marketing document.

FIG. 5A is an illustration of example entries 505A-505C of event-based mapping data structure 114 for documents injected into EDM repository 108 according to the one or more embodiments as described herein. In an embodiment, each entry, i.e., row, of event-based mapping data structure 114 includes values/identifiers stored in a BU column, a Document Type column, an Attribute column, a SOR column, a Duration column, and an Expiration Date column.

Therefore, in the example of FIG. 5A, the DM module 128 generates entry 505A for the brokerage account statement. Entry 505A stores settlement and clearing, identified by SC, in the BU column. Moreover, the DM module 128 stores account statement in the Document Type column, X01 (e.g., the attribute value) in the Attribute column, and brokerage services (identified by BrokeServ) in the SOR column.

The DM module 128 may obtain the duration value for the brokerage account statement from retention rule data structure 118 in a similar manner as described above in relation to step 235. For this example, let it be assumed that the duration is 7 (e.g., 7 years), indicating that the retention period for the brokerage account statement is 7 years from the date on which the brokerage account is purged. Therefore, entry 505A stores 7 in the Duration column.

However, let it be assumed that the brokerage account for customer X01 has not been purged as of yet, and the account statement was generated for storage at repository 108 on Jan. 1, 2024. As such, the retention policy is event-based, and the retention clock does not start when the brokerage account statement is stored at repository 108 on Jan. 1, 2024. Instead, the retention clock for the brokerage account statement starts on a date (e.g., a future date in relation to the storage date) when the brokerage account corresponding to customer X01 is determined to be purged by the brokerage services SOR 106. Accordingly, the expiration date column for entry 505A is not populated on Jan. 1, 2024, when brokerage account statement is stored in repository 108.

The DM module 128 creates similar entries 505B and 505C for the employee review and the internal marketing material, respectively. Let it be assumed that the employee review and internal marketing material are stored at repository 108 on Jan. 1, 2024. For entry 505B, let it be assumed that the duration of 2 indicates that the retention period for the employee review is 2 years from the date on which the employee is terminated. For entry 505C, let it be assumed that the retention period for the internal marketing material is 1 year after all employees have confirmed receiving the internal marketing material. As depicted in FIG. 5A, the Expiration Date column for entries 505A-505C does not include values/identifiers since the trigger event or action has not occurred on Jan. 1, 2024, which is the date on which the electronic documents are stored at repository 108. The procedure 200 of FIG. 2 then ends at step 255.

As will be described in further detail below in relation to FIG. 6, event tracking data structure 124 may track different events or actions that occur at each SOR 106. As will be described in further detail below in relation to FIG. 8, the DM module 128 may process the entries of event tracking data structure 124 to determine the expiration date for corresponding entries in event-based mapping data structure 114. Therefore, electronic documents can be efficiently and effectively stored in repository 108 as will be described in further detail below. As a result, electronic documents that are required to adhere to event-based retention policies can be timely destroyed or anonymized.

Figure 6:
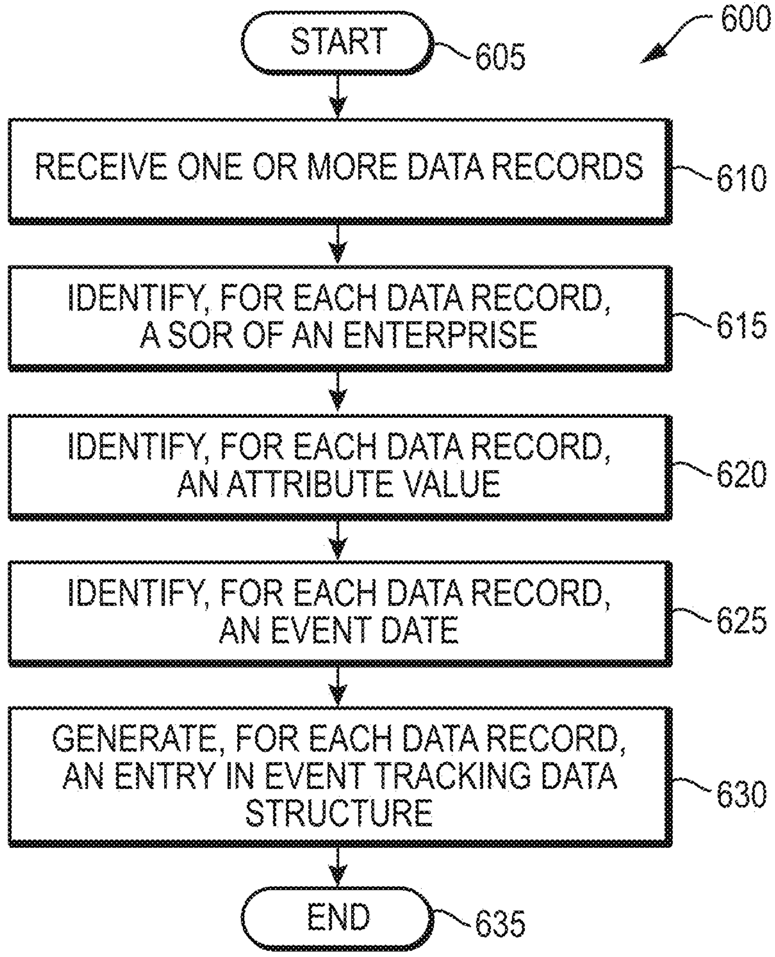
FIG. 6 is a flow diagram of a sequence of steps for generating entries for event tracking data structure of event tracking repository according to the one or more embodiments as described herein.

FIG. 6 is a flow diagram of a sequence of steps for generating event-tracking entries for event tracking data structure 124 of event tracking repository 122 according to the one or more embodiments as described herein. Although the examples as described in relation to FIG. 6 may refer to event tracking module 126 performing one or more functions/steps, it is expressly contemplated that DM/event tracking module 127 of FIG. 1B may also perform the one or more functions/steps according to the one or more embodiments as described herein.

The procedure 600 starts at step 605 and continues to step 610. At step 610, the event tracking module 126 receives one or more data records. In an embodiment, the one or more data records are received from one or more systems of record 106. For example, an event or action may occur at a particular SOR 106 which may cause the particular SOR 106 to send (i.e., push) a data record to event tracking module 126. In addition or alternatively, the event tracking module 126 may query one or more systems of record 106 at a predetermined time or a predetermined schedule to obtain the data records corresponding to events or actions that occurred. Each data record may comprise one or more packets (e.g., data packets).

The one or more data records may include information corresponding to the particular SOR 106 and/or the event or action. For example, the information may include, but is not limited to, an identifier of the particular SOR 106 that distinguishes the particular SOR 106 from other systems of record, a date and time when the event or action occurred, a user identifier of a user (e.g., authorized employee) that recorded the event or action at the particular SOR 106, a date and time when the event or action was recorded at the particular SOR 106.

Figure 7:
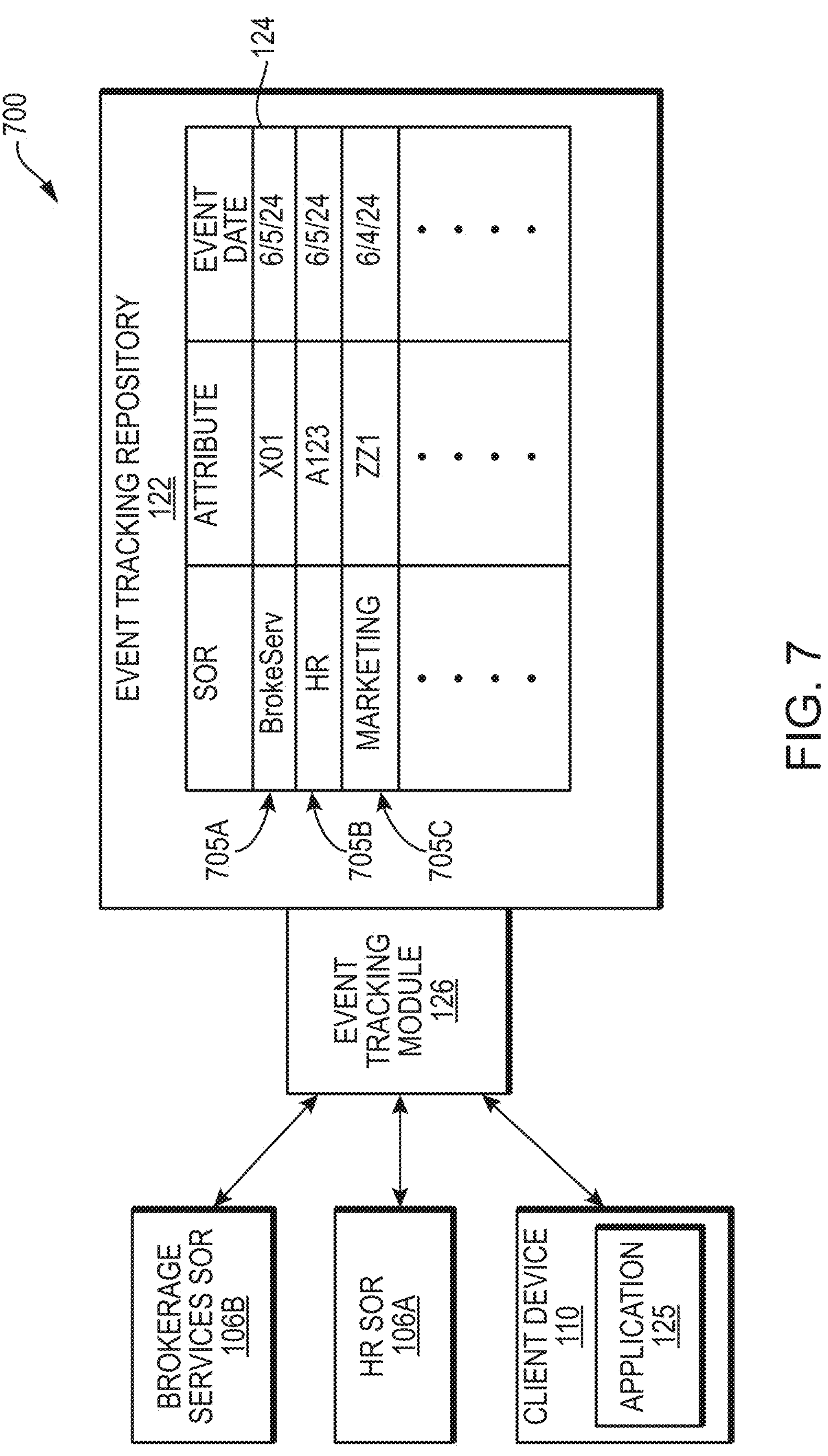
FIG. 7 is an example block diagram of two specific systems of record communicating with an event tracking module to generate event tracking entries according to the one or more embodiments as described herein.

FIG. 7 is an example block diagram of two specific systems of record 106 communicating with the event tracking module 126 according to the one or more embodiments as described herein. The inclusion of two systems of record 106 in FIG. 7 is for simplicity and illustrative purposes only. It should be understood that an enterprise may have many more systems of record 106.

Environment 700 includes a human resources (HR) SOR 106A that is responsible for managing all information related to employees of the enterprise that operates EDMS 104. Therefore, the HR SOR 106A is responsible for managing information associated with the lifecycle of employees and ensuring data accuracy, compliance with regulations, and supporting HR initiatives that may, for example, be initiated by the enterprise. For the example of FIG. 7, let it be assumed that an employee identified by A123 was terminated on Jun. 5, 2024. Therefore, and for this example, an employee of the HR department of the enterprise may update the HR SOR 106A to indicate that the employee identified by A123 was terminated on Jun. 5, 2024. Specifically, the employee of the HR department may utilize application 125 executing on client device 110 to update the HR SOR 106A. Based on the employee being terminated on Jun. 5, 2024, the event tracking module 126 of FIG. 7 may obtain a data record from HR SOR 106A.

Environment 700 also includes a brokerage services SOR 106B that is responsible for managing all information related to financial transactions, client accounts, regulatory compliance, etc. for the enterprise that, in this example, is a brokerage firm. For the example of FIG. 7, let it be assumed that the brokerage account for customer X01 was purged on Jun. 5, 2024. Specifically, let it be assumed that the brokerage account for customer X01 has been inactive for the required amount of time such that an employee in the brokerage services department of the enterprise purges the brokerage account for customer X01 on Jun. 5, 2024. The employee of the brokerage services department may utilize application 125 executing on client device 110 to update the brokerage services SOR 106B indicating that the brokerage account for customers X01 was purged on Jun. 1, 2024.

Environment 700 also includes application 125 executing on client device 110. In an embodiment, an employee authorized by the enterprise may manually create an event for a record that corresponds to a document 110 stored in repository 108. For the example of FIG. 7, let it be assumed that employee AU12 is an authorized employee and determines that the internal marketing material, identified by document identifier ZZ1, has been seen by all employees on Jun. 4, 2024. In an embodiment, employee AU12 may utilize application 125 executing on client device 110 to provide the data record, for this event, to event tracking module 126.

Referring back to FIG. 6, the procedure continues from step 610 to step 615 after the event tracking module 126 receives one or more data records. At step 615, the event tracking module 126 identifies a SOR 106 for each data record.

For example, the event tracking module 126 can analyze the data packets for each data record to identify a field identifier in the data record for a SOR. Based on identifying the field identifier, the event tracking module 126 can identify and determine the corresponding SOR for the data record. For the example as described above, the event tracking module 126 may analyze the data packets for the data record indicating that the employee identified by A123 was terminated on Jun. 5, 2024. Based on the analysis, the event tracking module 126 may determine that the data record corresponds to HR SOR 106A. Similarly, the event tracking module 126 may analyze the data packets for the data record indicating that the brokerage accounts for customer X01 was on Jun. 5, 2024. Based on the analysis, the event tracking module 126 may determine that the data records correspond to the brokerage services SOR 106B.

The event tracking module 126 may also analyze the data packets for the data record corresponding to the authorized employee indicating that an event or action occurred in relation to document ZZ1 on Jun. 24, 2024. Based on the analysis, the event tracking module 126 may determine that the data record corresponds to authorized employee AU12.

Referring back to FIG. 6, procedure 600 continues from step 615 to step 620. At step 620, the event tracking module 126 identifies, for each data record, an attribute value. Continuing with the example, the event tracking module 126 can analyze the data packets for the data record indicating that the employee identified by A123 was terminated on Jun. 5, 2024. Based on the analysis, the event tracking module 126 can identify the employee's name of A123 as the attribute value. Similarly, the event tracking module 126 can analyze the data packets for the data record indicating that brokerage account for customer X01 was purged on Jun. 5, 2024. Based on the analysis, the event tracking module 126 can identify the customer's name of X01 as the attribute value.

Further, the event tracking module 126 can analyze the data packets for the data record corresponding to the authorized employee indicating that an event or action occurred in relation to document ZZ1 on Jun. 4, 2024. Based on the analysis, the event tracking module 126 can identify the document identifier ZZ1 as the attribute value.

Procedure 600 continues from step 620 to step 625. At step 625, event tracking module 126 identifies an event date for each data record. Continuing with the example, the event tracking module 126 can analyze the data packets for the data record indicating that the employee identified by A123 was terminated on Jun. 5, 2024. Based on the analysis, the event tracking module 126 can identify that the event date as Jun. 5, 2024. Similarly, the event tracking module 126 can analyze the data packets for the data record indicating that brokerage account for customer X01 was purged on Jun. 5, 2024. Based on the analysis, the event tracking module 126 can identify the event date as Jun. 5, 2024.

Further, the event tracking module 126 can analyze the data packets for the data record corresponding to the authorized employee indicating that an event or action occurred in relation to document ZZ1 on Jun. 4, 2024. Based on the analysis, the event tracking module 126 can identify the event date as Jun. 4, 2024.

Procedure 600 continues from step 625 to step 630. At step 630, event tracking module 126 generates an entry in event tracking data structure 124 for each data record. Continuing with the example and as depicted in FIG. 7, there is an entry for each of the events as described above. Specifically, the second entry 705B (e.g., first row) of event tracking data structure 124 is generated for the termination of the employee identified by A123 on Jun. 5, 2024. Specifically, entry 70BA stores HR in the SOR column for the HR SOR 106A that was identified in step 615. Further, entry 705B stores A123 (e.g., employee identifier), which was identified in step 620, in the Attribute column. Moreover, entry 705B stores Jun. 5, 2024, which was identified in step 625, in the Event Date column.

Similarly, the first entry 705A of event tracking data structure 124 in FIG. 7 is generated for the customer brokerage account that was purged on Jun. 5, 2024. Further, the third entry 705C of event tracking data structure 124 in FIG. 7 is generated for the event (e.g., all employees had seen in the internal marketing material) for document ZZ1 that was manually created by authorized employee AU12. The procedure then ends at step 635.

As will be described in further detail below in relation to FIG. 8, the entries of event tracking data structure 124 in FIG. 7 can be utilized to update expiration date fields of entries in event-based mapping data structure 114 that correspond to documents that are required to adhere to event-based retention policies.

Figure 8:
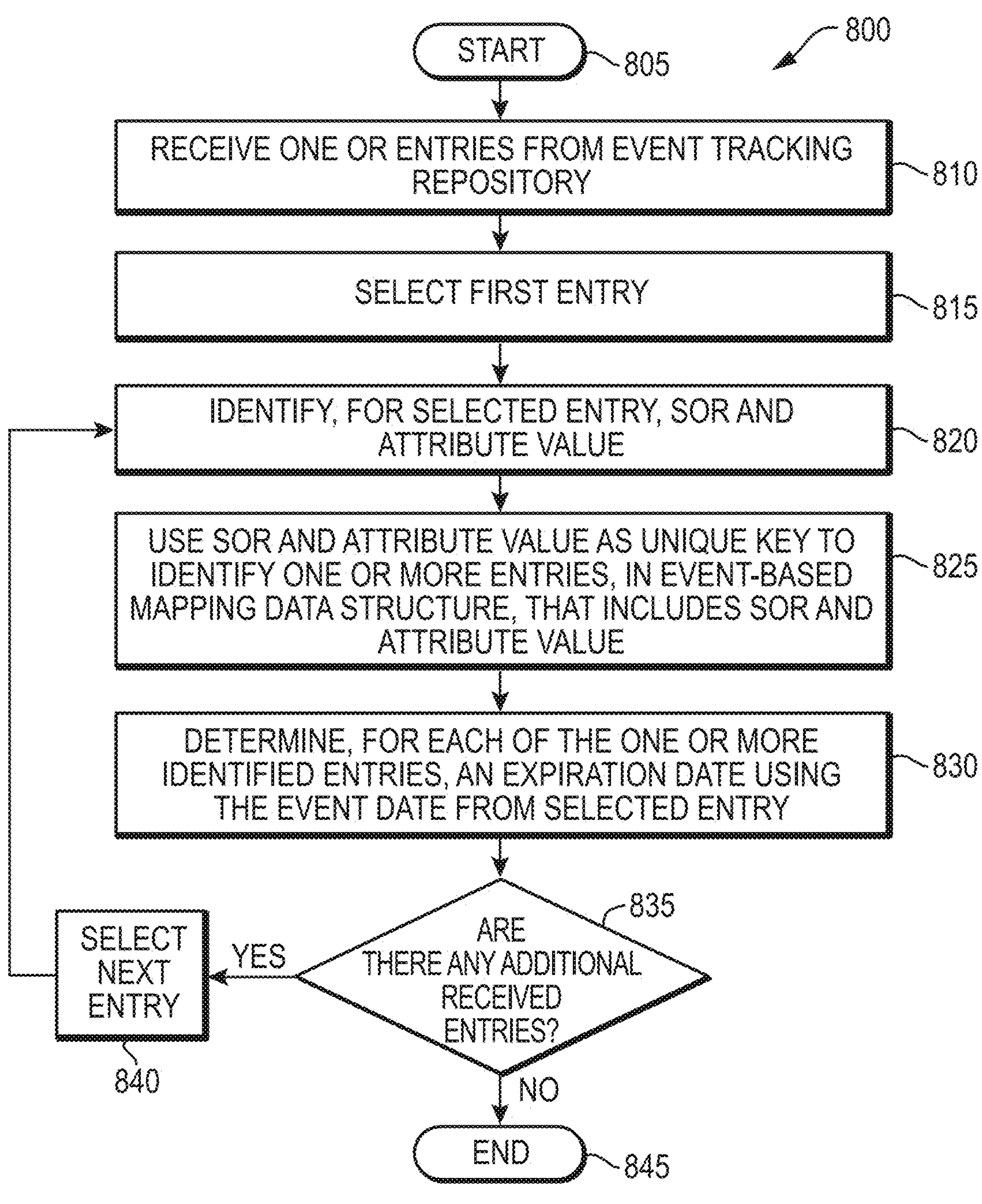
FIG. 8 is a flow diagram of a sequence of steps for processing event tracking entries to update expiration date of corresponding entries in event-based mapping structure according to the one or more embodiments as described herein.

FIG. 8 is a flow diagram of a sequence of steps for processing event-tracking entries to update the expiration date of corresponding entries in event-based mapping structure 114 according to the one or more embodiments as described herein. Although the examples as described in relation to FIG. 8 may refer to DM module 128 performing one or more functions/steps, it is expressly contemplated that DM/event tracking module 127 of FIG. 1B may also perform the one or more functions/steps according to the one or more embodiments as described herein.

Procedure 800 starts at step 805 and continues to step 810. At step 810, the DM module 128 receives one or more entries from event tracking repository 122. For the example as described herein, let it be assumed that the DM module 128 receives the three entries 705-70C from the event tracking data structure 124 of FIG. 7.

Procedure 800 continues from step 810 to step 815. At step 815, the DM module 128 selects the first entry. In this example, the DM module 128 selects the first entry 705A for the customer brokerage account that was purged on Jun. 5, 2024. The procedure continues to step 820 and the DM module 128 identifies the SOR and attribute value from the selected entry. In this example, the DM module 128 determines that the SOR from the first entry is brokerage services. Further, the DM module 128 determines that the attribute value from the first entry is X01.

Procedure 800 continues from step 820 to step 825. At step 825, the DM module 128 uses the SOR and attribute value together as a unique key to identify one or more entries from event-based mapping data structure 114. Specifically, the DM module 128 uses the identified SOR and attribute value to identify one or more entries 505 in event-based mapping data structure 114 that stores the same SOR identifier and the same attribute value.

For this example, the DM module 128 compares the brokerage services SOR identified at step 825 with the identifiers stored in the SOR column of each of entries 505 in event-based mapping data structure 114. Further the DM module compares X01 that is the attribute value identified at step 825 with the identifiers stored in the Attribute column of each of entries 505 in event-based mapping data structure 114. In this example, entry 505A of event-based mapping data structure 114 matches the SOR and attribute value identified in step 825. Specifically, entry 505A includes brokerage services in the SOR column and X01 in the Attribute column. Therefore, the DM module 128 identifies entry 505A of event-based mapping data structure 114 for the first entry 705A of event tracking data structure 124 of FIG. 7.

The procedure continues from step 830 to step 835. At step 835, the DM module 128 updates, for each entry identified from event-based mapping data structure 114, the expiration date using the event date from the selected entry. In this example, entry 505A is identified in step 830. As such, the DM module 128 updates the expiration date for entry 505A using the event date of Jun. 5, 2024. Specifically, and in this example, the brokerage account for customer X01 was purged on Jun. 5, 2024, which is the event or action date that is stored in entry 705A. Therefore, Jun. 5, 2024, is the date that triggers the retention clock. As such, the DM module 128 may determine the expiration date, i.e., retention expiration date, by adding the duration from entry 505A to the event date obtained from entry 705A. Therefore, and in this example, the expiration date for entry 505A is Jun. 5, 2031 (e.g., Jun. 5, 2024+7 years).

As such, the brokerage account statement for customer X01 has to be retained until Jun. 5, 2031. After that, the brokerage account statement for customer X01 can be destroyed or anonymized. By tracking the event dates using event tracking data structure 124, the one or more embodiments as described herein can more effectively and efficiently manage electronic documents when compared to conventional systems that may, for example, retain electronic documents for longer than is required to ensure no retention policy is violated. As such, the one or more embodiments as described herein conserve processing resources when compared to conventional systems.

Referring back to FIG. 8, the procedure continues from step 830 to step 835. At step 835, the DM module 128 determines if there are any additional entries. If so, the procedure continues from step 835 to step 840 to select the next entry from the event-tracking data structure 124 and then reverts to step 820. The procedure repeats until all entries have been selected such that matching entries in event-based mapping data structure can be updated with a determined expiration date as described herein. Therefore, and in the example described herein, the procedure is repeated for entries 705B and 705C of event tracking data structure 124 to update the expiration date for corresponding entries (e.g., 505B and 505C) of event mapping data structure 114. The procedure ends at step 844.

FIG. 5B is an illustration of example entries 505A-505C of event-based mapping data structure 114 that have been updated with expiration dates according to the one or more embodiments as described herein. FIG. 5B is similar to FIG. 5A. However, the expiration dates that were not populated in FIG. 5A are now populated in FIG. 5B based on processing entries 705A-705C of event-based tracking data structure 124 as described above in relation to FIG. 8.

As a result, the electronic documents 110 (e.g., account statement, employee review, and internal marketing material) corresponding to updated entries 505A-505C of FIG. 5B can adhere to the event-based retention policies and can also be destroyed or anonymized timely and efficiently for proper management of electronic documents at repository 108. Specifically, the one or more embodiments as described herein can destroy or anonymize an electronic document 110 in a timely manner after the retention expiration date in Expiration Date column of FIG. 5B lapses.

As a result, the one or more embodiments as described herein ensure that electronic document sanitization is achieved, sensitive electronic information is not accessible to cyber threats and unauthorized access for longer than is necessary, and storage costs and resources are preserved and not wasted. Furthermore, operational efficiency and transparency is maintained, which can be important to stakeholders, auditors, and the like. Therefore, the one or more embodiments as described herein provide an improvement in the technological field of electronic document management and, namely, electronic document management with event-based retention policies.

What is claimed is:

1. A computer-implemented method for electronic document management in a computing environment, the computer-implemented method comprising:

receiving, at an electronic document management system (EDMS) repository, a request to store a first electronic document;

determining, by a software module executed by a processor coupled to a memory of the computing environment, a business unit corresponding to the first electronic document;

determining, by the software module, a first document type for the first electronic document, wherein the first document type is associated with an event-based retention policy of a plurality of different retention policies;

determining, by the software module, a system of record identifier and an attribute identifier for the first electronic document;

generating a mapping entry in a mapping data structure for the first electronic document, wherein the mapping entry includes at least the business unit, the first document type, the attribute identifier, the system of record identifier, a first duration value corresponding to the event-based retention policy, and a particular expiration date field that is unpopulated and a particular expiration date value is not stored in the particular expiration date field until a first event or a first action associated with the first electronic document occurs, wherein the event-based retention policy has an associated first retention clock, wherein the first retention clock is triggered to start on a first event date when the first event or the first action associated with the first electronic document occurs, and wherein the first event date is a first future date in relation to when the first electronic document is stored at the EDMS repository;

receiving an event-based tracking entry of an event tracking data structure, wherein the event-based tracking entry corresponds to a particular event occurring and corresponds to a particular system of record of a plurality of different system of records;

comparing a tracking system of record identifier and a tracking attribute identifier, from the event-based tracking entry, with a plurality of mapping entries in the mapping data structure;

identifying, based on a match of the comparison, a selected mapping entry from the plurality of mapping entries; and updating the selected mapping entry, corresponding to a particular electronic document, to store a first retention expiration date in a selected expiration date field of the selected mapping entry so that the selected expiration date field changes from being unpopulated to populated, wherein the first retention expiration date is determined based on a particular event-based retention policy and a particular duration value stored in the selected mapping entry, wherein the particular event-based retention policy has an associated particular retention clock that is (1) triggered to start when a second event or second action occurs at a second future date in relation to the particular electronic document being stored and (2) ends on the first retention expiration date.

2. The computer-implemented method of claim 1, further comprising:

determining the first retention expiration date based on a summation of the particular duration value and the event date.

3. The computer-implemented method of claim 1, further comprising:

deleting a selected document, corresponding to each of the one or more selected mapping entries, from the EDMS repository on or after the first retention expiration date, or anonymizing the selected document, corresponding to each of the one or more selected mapping entries, in the EDMS repository on or after the first retention expiration date.

4. The computer-implemented method of claim 1, wherein the plurality of different retention policies includes event-based types of retention policies and time-based types of retention policies, and the event-based retention policy is one of the event-based types of retention policies, and wherein the event-based types of retention policies have different requirements for retaining and/or destroying stored electronic documents.

5. The computer-implemented method of claim 1, wherein the particular retention clock expires on the first retention expiration date that is a summation of an event date on which the particular event occurred and the particular duration value.

6. The computer-implemented method of claim 1, further comprising:

determining, by the software module, a second document type for a second electronic document stored at the EDMS repository;

determining, by the software module, that the second document type is associated with a time-based retention policy of the plurality of different retention policies; and generating a time-based entry in the mapping data structure for the second electronic document, wherein the time-based entry includes at least the second document type and a second retention expiration date that is based on a second duration value that is derived from the time-based retention policy, wherein the second retention expiration date is derived based on a store date on which the second electronic document is stored at the EDMS repository.

7. The computer-implemented method of claim 1, further comprising:

determining, by the software module, a label that corresponds to the first document type; and utilizing the label to identify the system of record, for the first document, in a record management system that stores a mapping between a plurality of labels and a plurality of system of records.

8. The computer-implemented method of claim 1, further comprising:

determining, by the software module, a label that corresponds to the first document type; and utilizing the label to identify the first duration value, for the first document, in a record management system that stores a mapping between a plurality of labels and a plurality of different duration values for the plurality of different retention policies.

9. A system for electronic document management in a computing environment, the system comprising:

a memory;

a processor coupled to a memory, the processor executing a software module configured to:

receive a request to store a first electronic document at an electronic document management system (EDMS) repository;

determine a business unit corresponding to the first electronic document;

determine a first document type for the first electronic document, wherein the first document type is associated with an event-based retention policy of a plurality of different retention policies;

determine a system of record identifier and an attribute identifier for the first electronic document;

generate a mapping entry in a mapping data structure for the first electronic document, wherein the mapping entry includes at least the business unit, the first document type, the attribute identifier, the system of record identifier, a first duration value corresponding to the event-based retention policy, and a particular expiration date field that is unpopulated and a particular expiration date value is not stored in the particular expiration date field until a first event or a first action associated with the first electronic document occurs, wherein the event-based retention policy has an associated first retention clock, wherein the first retention clock is triggered to start on a first event date when the first event or the first action associated with the first electronic document occurs, and wherein the first event date is a first future date in relation to when the first electronic document is stored at the EDMS repository;

receive an event-based tracking entry of an event tracking data structure, wherein the event-based tracking entry corresponds to a particular event occurring and corresponds to a particular system of record of a plurality of different system of records;

compare a tracking system of record identifier and a tracking attribute identifier, from the event-based tracking entry, with a plurality of mapping entries in the mapping data structure;

identify, based on a match of the comparison, a selected mapping entry from the plurality of mapping entries; and update the selected mapping entry, corresponding to a particular electronic document, to store a first retention expiration date in a selected expiration date field of the selected mapping entry so that the selected expiration date field changes from being unpopulated to populated, wherein the first retention expiration date is determined based on a particular event-based retention policy and a particular duration value stored in the selected mapping entry, wherein the particular event-based retention policy has an associated particular retention clock that is (1) triggered to start when a second event or second action occurs at a second future date in relation to the particular electronic document being stored and (2) ends on the first retention expiration date.

10. The system of claim 9, wherein the software module further configured to:

determine the first retention expiration date based on a summation of the particular duration value and an event date on which the particular event occurred causing the generation of the event-based tracking entry for the event tracking data structure.

11. The system of claim 9, wherein the software module further configured to:

delete a selected document, corresponding to each of the one or more selected mapping entries, from the EDMS repository on or after the first retention expiration date, or anonymize the selected document, corresponding to each of the one or more selected mapping entries, in the EDMS repository on or after the first retention expiration date.

12. The system of claim 9, wherein the plurality of different retention policies includes event-based types of retention policies and time-based types of retention policies, and the event-based retention policy is one of the event-based types of retention policies, and wherein the event-based types of retention policies have different requirements for retaining and/or destroying stored electronic documents.

13. The system of claim 9, wherein the particular retention clock expires on the first retention expiration date that is a summation of an event date on which the particular event occurred and the particular duration value.

14. The system of claim 9, wherein the software module further configured to:

determine a second document type for a second electronic document stored at the EDMS repository;

determine that the second document type is associated with a time-based retention policy of the plurality of different retention policies; and generate a time-based entry in the mapping data structure for the second electronic document, wherein the time-based entry includes at least the second document type and a second retention expiration date that is based on a second duration value that is derived from the time-based retention policy, wherein the second retention expiration date is derived based on a store date on which the second electronic document is stored at the EDMS repository.

15. The system of claim 9, wherein the software module further configured to:

determine a label that corresponds to the first document type; and utilize the label to identify the system of record, for the first document, in a record management system that stores a mapping between a plurality of labels and a plurality of system of records.

16. The system of claim 9, wherein the software module further configured to:

determine a label that corresponds to the first document type; and utilize the label to identify the first duration value, for the first document, in a record management system that stores a mapping between a plurality of labels and a plurality of different duration values for the plurality of different retention policies.

17. A computer-implemented method for electronic document management in a computing environment, the computer-implemented method comprising:

receiving, by a software module executed by a processor, an event based tracking entry from an event tracking data structure, wherein the event based tracking entry is generated for storage in the event tracking data structure in response to a particular event occurring and corresponding to a particular system of record of a plurality of different system of records, wherein the event-based tracking entry includes a system of record identifier for a system of record where the event occurred, an attribute identifier, and an event date indicating a date on when the event occurred;

comparing, by the software module, the system of record identifier and the attribute identifier, from the event-based tracking entry, to a plurality of different event-based entries of an event-based mapping data structure stored at an electronic document management system (EDMS) repository, wherein the EDMS repository stores a plurality of different electronic documents associated with a plurality of different system of records;

identifying, by the software module and based on the comparison, a selected event-based entry from the plurality of event-based entries, wherein the selected event-based entry includes event-based information that substantially matches the system of record identifier and the attribute identifier and further includes an expiration date field that is unpopulated; and updating, by the software module, the selected event-based entry to store a retention expiration date in the expiration date field so that the expiration date filed changes from being unpopulated to populated, wherein the retention expiration date is based on an event-based retention policy that includes an associated retention clock that is (1) triggered to start on an event date that indicates when the particular event occurred and the event date is a future date in relation to when the particular document is stored at the EDMS repository and (2) ends on the retention expiration date, and wherein the retention expiration date is derived from a duration value that is included in the event-based information of the selected entry and the event date.

18. The computer-implemented method of claim 17, further comprising:

determining, by the software module, the retention expiration date based on a summation of the duration value and the event date.

19. The computer-implemented method of claim 17, further comprising:

deleting a selected document, corresponding to each of the one or more selected event-based entries, from the EDMS repository on or after the retention expiration date, or anonymizing the selected document, corresponding to each of the one or more selected event-based entries, in the EDMS repository on or after the retention expiration date.

20. The computer-implemented method of claim 17, further comprising:

determining, by the software module, a label that corresponds to a business unit and document type, included in the event-based information; and utilizing the label to identify the duration value in a record management system that stores a mapping between a plurality of labels and a plurality of different duration values for a plurality of different retention policies.

* * * * *